United States Patent
Yamamoto et al.

(10) Patent No.: US 12,060,849 B2
(45) Date of Patent: Aug. 13, 2024

(54) INTERNAL COMBUSTION ENGINE

(71) Applicant: ISUZU MOTORS LIMITED, Tokyo (JP)

(72) Inventors: Kazunari Yamamoto, Fujisawa (JP); Misao Goto, Fujisawa (JP); Takumi Komiyama, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/194,149

(22) Filed: Mar. 31, 2023

(65) Prior Publication Data

US 2023/0332559 A1 Oct. 19, 2023

(30) Foreign Application Priority Data

Apr. 13, 2022 (JP) ................. 2022-066316

(51) Int. Cl.
| | | |
|---|---|---|
| *F02F 11/00* | (2006.01) | |
| *F02F 1/24* | (2006.01) | |
| *F16J 15/32* | (2016.01) | |

(52) U.S. Cl.
CPC .............. *F02F 11/002* (2013.01); *F02F 1/24* (2013.01); *F16J 15/32* (2013.01)

(58) Field of Classification Search
CPC ... F02F 11/002; F02F 1/24; F02F 11/00; F16J 15/32
See application file for complete search history.

(56) References Cited

U.S. PATENT DOCUMENTS

| | | | |
|---|---|---|---|
| 2,939,753 A * | 6/1960 | Schilling | ............... F02F 11/002 220/378 |
| 4,513,703 A | 4/1985 | Eckert | |
| 4,774,917 A | 10/1988 | Tokoro | |
| 5,154,433 A | 10/1992 | Naruse | |
| 6,036,194 A * | 3/2000 | Stamper | ............... F16J 15/0881 277/593 |
| 6,367,463 B1 | 4/2002 | Nurmi | |
| 6,367,848 B1 * | 4/2002 | Bruce | ...................... F02F 1/16 123/193.2 |
| 2007/0107689 A1 | 5/2007 | Oogake et al. | |
| 2013/0068188 A1 | 3/2013 | Liander et al. | |
| 2018/0266359 A1 | 9/2018 | Beasley | |
| 2023/0026354 A1 | 1/2023 | Terakado et al. | |

FOREIGN PATENT DOCUMENTS

| | | |
|---|---|---|
| CN | 211819644 U | 10/2020 |
| DE | 3236185 A1 | 4/1984 |
| JP | S55-112023 U | 8/1980 |
| JP | S56-011345 U | 1/1981 |

(Continued)

*Primary Examiner* — Syed O Hasan
(74) *Attorney, Agent, or Firm* — PROCOPIO, CORY, HARGREAVES & SAVITCH LLP

(57) ABSTRACT

An internal combustion engine includes: a cylinder in which a piston reciprocates; a cylinder head positioned above the cylinder; a gasket disposed between the cylinder and the cylinder head; a stepped portion formed at an upper end portion of an inner peripheral surface of the cylinder; a ring member having a cylindrical shape provided to the stepped portion; and a seal member that is provided on an upper surface of the ring member and is sandwiched between the ring member and the cylinder head.

14 Claims, 4 Drawing Sheets

(56) References Cited

FOREIGN PATENT DOCUMENTS

| | | |
|---|---|---|
| JP | H11-294255 A | 10/1999 |
| JP | 2013-530340 A | 7/2013 |
| JP | 2016-075270 A | 5/2016 |
| JP | 2017-089410 A | 5/2017 |
| JP | 2017-089411 A | 5/2017 |

* cited by examiner

INTERNAL COMBUSTION ENGINE

CROSS-REFERENCE TO RELATED APPLICATIONS

The present application claims priority to Japanese Patent Applications number 2022-066316, filed on Apr. 13, 2022 contents of which are incorporated herein by reference in their entirety.

BACKGROUND OF THE INVENTION

The present disclosure relates to an internal combustion engine including a cylinder and a piston.

In an internal combustion engine, a ring member is provided to a stepped portion formed on an upper portion of an inner peripheral surface of a cylinder. For example, Japanese Unexamined Patent Application Publication No. 2017-089410 discloses an internal combustion engine in which a scraper ring is provided to a stepped portion in order to remove soot adhered to a piston.

Although the above-described stepped portion is positioned below a gasket provided between the cylinder and the cylinder head, there is a gap between the ring member provided to the stepped portion and the gasket. If there is a gap, a lower surface of the gasket may be deformed due to exposure to combustion gas, or the combustion gas may flow around the outer peripheral surface of the ring member through the gap.

BRIEF SUMMARY OF THE INVENTION

The present disclosure has been made in view of these points, and its object is to prevent adverse effects caused by the gap between the ring member and the gasket.

An aspect of the present disclosure provides an internal combustion engine including: a cylinder in which a piston reciprocates; a cylinder head positioned above the cylinder; a gasket disposed between the cylinder and the cylinder head; a stepped portion formed at an upper end portion of an inner peripheral surface of the cylinder; a ring member having a cylindrical shape provided to the stepped portion; and a seal member that is provided on an upper surface of the ring member and is sandwiched between the ring member and the cylinder head.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Configuration of the International Engine>

A configuration of an internal combustion engine according to an embodiment will be described with reference to FIG. 1.

Figure 1:
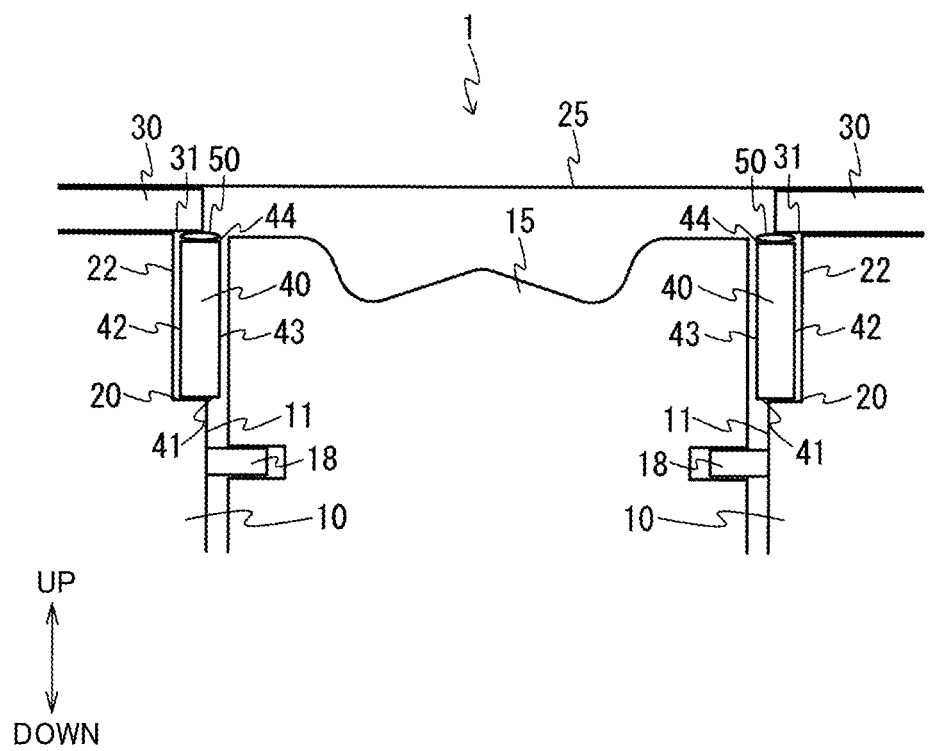
FIG. 1 is a schematic view illustrating an internal configuration of an internal combustion engine 1 according to an embodiment.

FIG. 1 is a schematic view illustrating an internal configuration of an internal combustion engine 1 according to an embodiment. In FIG. 1, only a portion of the internal combustion engine 1 is shown, and other components are omitted for convenience of explanation.

The internal combustion engine 1 is an engine mounted in a vehicle, for example. As shown in FIG. 1, the internal combustion engine 1 includes a cylinder 10, a piston 15, a stepped portion 20, a cylinder head 25, a gasket 30, a ring member 40, and a seal member 50.

The cylinder 10 is made of metal and formed in a cylindrical shape. The piston 15 is housed in the cylinder 10.

The piston 15 reciprocates between the top dead center and the bottom dead center in the cylinder 10. In FIG. 1, the piston 15 is positioned at the top dead center. A piston ring 18 is fitted into a groove formed on the outer peripheral surface of the piston 15.

As shown in FIG. 1, the stepped portion 20 is positioned at an upper end portion of the inner peripheral surface 11 of the cylinder 10. The stepped portion 20 is positioned above the piston ring 18 when the piston 15 is positioned at the top dead center. The stepped portion 20 is formed such that the stepped portion 20 extends circumferentially inside the inner peripheral surface 11 of the cylinder 10. Further, the stepped portion 20 is positioned below the gasket 30. The stepped portion 20 has an inner peripheral surface 22 that is perpendicular to the bottom surface of the stepped portion 20.

The cylinder head 25 is positioned above the cylinder 10. The cylinder head 25 is made of metal, and is made of the same material as the cylinder 10, for example. The gasket 30 is disposed between the cylinder 10 and the cylinder head 25. The gasket 30 has a function of enhancing airtightness in the cylinder 10. A side surface of the gasket 30 is positioned closer to the ring member 40 than the inner peripheral surface 22 of the stepped portion 20.

As shown in FIG. 1, the ring member 40 is provided to the stepped portion 20. Specifically, the ring member 40 is fitted into the stepped portion 20. The ring member 40 is formed in a cylindrical shape and covers the circumference of the piston 15 positioned at the top dead center. The ring member 40 is made of metal. Here, the ring member 40 is made of the same material as the cylinder 10, but is not limited thereto, and may be made of a different material than the cylinder 10.

The ring member 40 is provided to narrow the space between the cylinder 10 and the piston 15. That is, the inner peripheral surface 43 of the ring member 40 is positioned closer to the outer peripheral surface of the piston 15 than the inner peripheral surface 11 of the cylinder 10. If the ring member 40 is not provided, the space between the inner peripheral surface 11 of the cylinder 10 and the outer peripheral surface of the piston 15 ends up being a useless space, which is not used for combustion, thereby reducing combustion efficiency. On the other hand, if the ring member 40 is provided as in the present embodiment, it is possible to narrow the useless space, and thus the compression ratio is increased and fuel efficiency is improved.

The lower surface 41 of the ring member 40 is in contact with the bottom surface of the stepped portion 20. The outer peripheral surface 42 of the ring member 40 is separated from the inner peripheral surface 22 of the stepped portion 20. Therefore, there is a space between the outer peripheral surface 42 of the ring member 40 and the inner peripheral surface 22 of the stepped portion 20.

As shown in FIG. 1, the seal member 50 is provided on the upper surface 44 of the ring member 40. Further, the seal member 50 is provided such that the seal member 50 is sandwiched between the ring member 40 and the cylinder head 25. Specifically, the ring member 40 and the cylinder head 25 sandwich the seal member 50 and the gasket 30. Further, the seal member 50 is in contact with both the ring member 40 and the gasket 30. Specifically, the seal member 50 is in contact with the upper surface 44 of the ring member 40 and an end portion of the lower surface 31 of the gasket 30. Since the seal member 50 is in contact with the end portion of the lower surface 31 of the gasket 30, the seal member 50 and the gasket 30 easily come into close contact with each other.

Similar to the ring member 40, the seal member 50 is formed in an annular shape. The inside of the seal member 50 is hollow along the circumferential direction. Further, the material of the seal member 50 is softer than the materials of the ring member 40 and the cylinder head 25. Therefore, the seal member 50 is crushed between the ring member 40 and the cylinder head 25. As a result, a sealed state between the ring member 40 and the gasket 30 can be enhanced, and providing the seal member 50 has benefits compared to the comparative example shown in FIG. 2.

Figure 2:
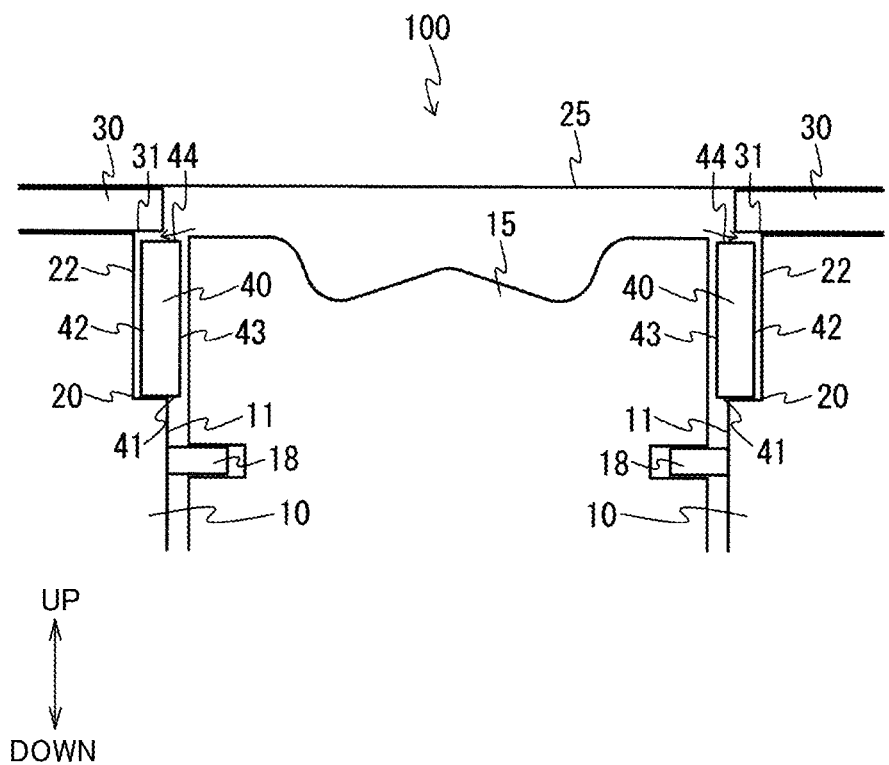
FIG. 2 is a schematic view illustrating an internal combustion engine 100 according to a comparative example.

FIG. 2 is a schematic view illustrating an internal combustion engine 100 according to the comparative example. In the comparative example, the seal member 50 shown in FIG. 1 is not provided. Further, the upper surface 44 of the ring member 40 is not in contact with the lower surface 31 of the gasket 30, and thus a gap is formed between the ring member 40 and the gasket 30. When the gap is formed, air or the like in the cylinder enters the space between the outer peripheral surface 42 of the ring member 40 and the inner peripheral surface 22 of the stepped portion 20 (see arrows shown in FIG. 2). When the gap is formed, the gasket 30 may be deformed due to the lower surface 31 of the gasket 30 being exposed to combustion gas at a high temperature, for example.

On the other hand, in the present embodiment, since the seal member 50 is in contact with the upper surface 44 of the ring member 40 and the lower surface 31 of the gasket 30, it is possible to prevent formation of a gap between the ring member 40 and the gasket 30. In particular, since the seal member 50 is in close contact with the ring member 40 and the gasket 30, it is possible to effectively prevent air or the like from entering the space between the outer peripheral surface 42 of the ring member 40 and the inner peripheral surface 22 of the stepped portion 20. Further, since the seal member 50 is in contact with the lower surface 31 of the gasket 30, it is possible to prevent the gasket 30 from being deformed due to exposure to fuel gas.

MODIFIED EXAMPLE

Hereinafter, two modified examples of the internal configuration of the internal combustion engine 1 will be described with reference to FIGS. 3 and 4.

Figure 3:
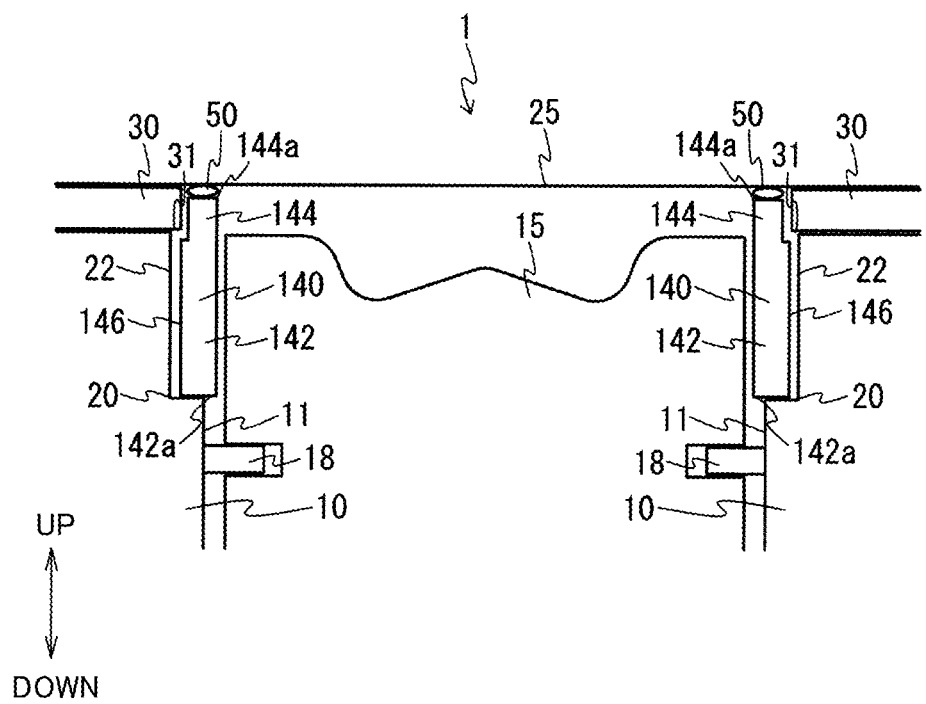
FIG. 3 is a schematic view illustrating the first modified example of the internal configuration of the internal combustion engine 1.

FIG. 3 is a schematic view illustrating the first modified example of the internal configuration of the internal combustion engine 1.

The shape of the ring member 140 of the first modified example is different from the shape of the ring member 40 of FIG. 1. Since configurations of other components of the first modified example are the same as the configurations shown in FIG. 1, detailed description thereof will be omitted.

As shown in FIG. 3, the ring member 140 has a stepped shape. The ring member 140 has a lower portion 142 and an upper portion 144.

The lower portion 142 is a first portion facing the stepped portion 20, and is fitted into the stepped portion 20. The lower surface 142a of the lower portion 142 is in contact with the bottom surface of the stepped portion 20.

The upper portion 144 is positioned above the stepped portion 20, and is a second portion facing a side surface of the gasket 30. The width of the upper portion 144 is smaller than the width of the lower portion 142. The seal member 50 is provided on the upper surface 144a of the upper portion 144.

The seal member 50 of the first modified example is in contact with both the ring member 140 and the cylinder head 25. Specifically, the seal member 50 is in contact with both the upper portion 144 of the ring member 140 and the cylinder head 25.

In the case of the first modified example, since the seal member 50 is positioned such that the seal member 50 is in contact with both the ring member 140 and the cylinder head 25, it is possible to prevent formation of a gap between the ring member 140 and the gasket 30. This makes it possible to effectively prevent air or the like from entering the space between the outer peripheral surface 146 of the ring member 140 and the inner peripheral surface 22 of the stepped portion 20. Further, it is possible to prevent the lower surface 31 of the gasket 30 from being exposed to fuel gas.

Figure 4:
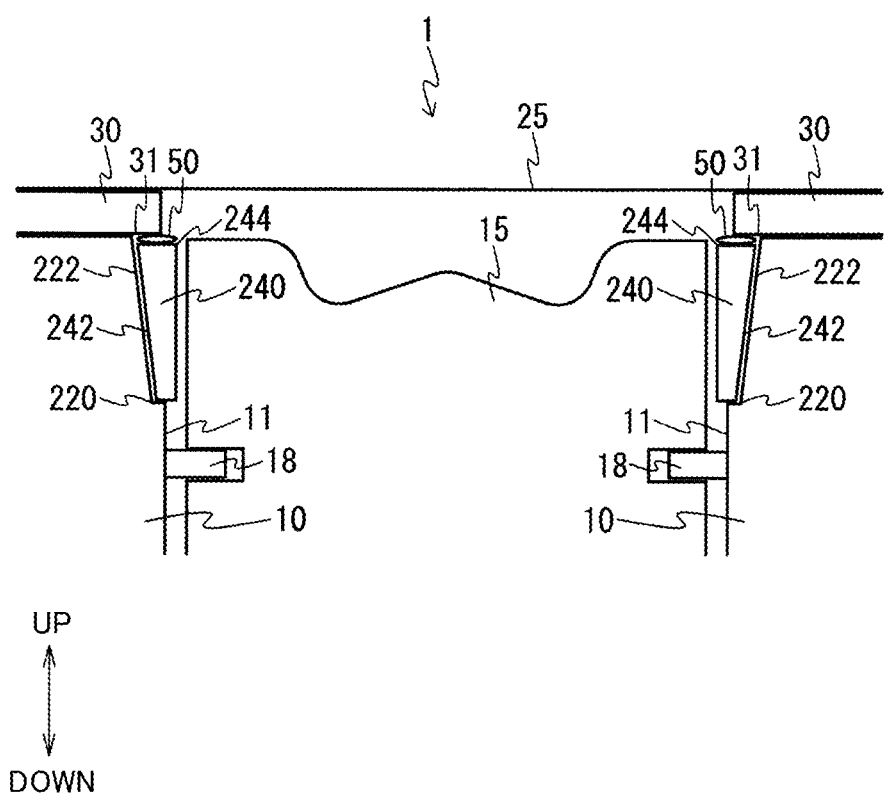
FIG. 4 is a schematic view illustrating the second modified example of the internal configuration of the internal combustion engine 1.

FIG. 4 is a schematic view illustrating the second modified example of the internal configuration of the internal combustion engine 1.

The shapes of the stepped portion 220 and the ring member 240 of the second modified example are different from the shapes of the stepped portion 20 and the ring member 40 of FIG. 1. Since configurations of other components of the second modified example are similar to the configurations shown in FIG. 1, detailed description thereof will be omitted.

Unlike the inner peripheral surface 22 of the stepped portion 20 of FIG. 1, the inner peripheral surface 222 of the stepped portion 220 is an inclined surface as shown in FIG. 4. The inner peripheral surface 222 is linearly inclined at a predetermined inclination angle.

As shown in FIG. 4, the outer peripheral surface 242 of the ring member 240 is a tapered surface such that the diameter of the ring member 240 decreases downwards. That is, the width of an upper portion of the ring member 240 is larger than the width of a lower portion of the ring member 240. Further, the outer peripheral surface 242 is parallel to the inner peripheral surface 222 of the stepped portion 220. That is, the inclination angle of the outer peripheral surface 242 is the same as the inclination angle of the inner peripheral surface 222. It should be noted that the seal member 50 described in FIG. 1 is provided on the upper surface 244 of the ring member 240.

In the case of the second modified example, since the outer peripheral surface 242 of the ring member 240 is a tapered surface and the inner peripheral surface 222 of the stepped portion 220 is an inclined surface, the ring member 240 can be easily fitted into the stepped portion 220 as compared with a case where a tapered surface and an inclined surface are not provided. Further, when the ring member 240 is fitted into the stepped portion 220, it is possible to prevent the ring member 240 from being hooked and damaged by the stepped portion 220.

Effects of the Present Embodiment

The internal combustion engine 1 of the above-described embodiment includes the ring member 40 having a cylindrical shape, which is provided to the stepped portion 20 formed on an upper end portion of the cylinder 10, and the seal member 50 that is provided on the upper surface of the ring member 40 and is sandwiched between the ring member 40 and the cylinder head 25. Providing the above-described seal member 50 prevents formation of a gap between the ring member 40 and the gasket 30. Thus, it is possible to effectively prevent air or the like from entering the space between the outer peripheral surface 42 of the ring member 40 and the inner peripheral surface 22 of the stepped portion 20, and it is possible to prevent the gasket 30 from being deformed due to the lower surface 31 of the gasket 30 being exposed to fuel gas.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. An internal combustion engine comprising: a cylinder in which a piston reciprocates, the cylinder having an inner peripheral surface partially being directly exposed to an outer peripheral surface of the piston; a cylinder head positioned above the cylinder; a gasket disposed between the cylinder and the cylinder head; a stepped portion formed at an upper end portion of the inner peripheral surface of the cylinder; a ring member having a cylindrical shape provided to the stepped portion; a seal member that is provided on an upper surface of the ring member and is sandwiched between the ring member and the cylinder head, and wherein the seal member is in contact with an upper surface of the ring member and an end portion of a lower surface of the gasket.

2. The internal combustion engine according to claim 1, wherein a space is formed between an outer peripheral surface of the ring member and an inner peripheral surface of the stepped portion, and
the seal member is in contact with both the ring member and the gasket.

3. The internal combustion engine according to claim 1, wherein
a space is formed between an outer peripheral surface of the ring member and an inner peripheral surface of the stepped portion, and
the seal member is in contact with both the ring member and the cylinder head.

4. The internal combustion engine according to claim 1, wherein the seal member is formed in an annular shape.

5. The internal combustion engine according to claim 4, wherein
the seal member is hollow along a circumferential direction and is crushed between the ring member and the cylinder head.

6. The internal combustion engine according to claim 5, wherein a material of the seal member is softer than materials of the ring member and the cylinder head.

7. The internal combustion engine according to claim 1, wherein
an outer peripheral surface of the ring member is a tapered surface such that a diameter of the ring member decreases downwards, and
an inner peripheral surface of the stepped portion is an inclined surface parallel to the tapered surface of the ring member.

8. The internal combustion engine according to claim 1, wherein, below the stepped portion, the inner peripheral surface of the cylinder is directly exposed to the outer peripheral surface of the piston.

9. The internal combustion engine according to claim 8, wherein, above the stepped portion, the ring member is disposed between the inner peripheral surface of the cylinder and the outer peripheral surface of the piston.

10. The internal combustion engine according to claim 1, wherein, only below the stepped portion, the inner peripheral surface of the cylinder is directly exposed to the outer peripheral surface of the piston.

11. The internal combustion engine according to claim 9, wherein, only above the stepped portion, the ring member is disposed between the inner peripheral surface of the cylinder and the outer peripheral surface of the piston.

12. The internal combustion engine according to claim 1, wherein the ring member includes a first portion facing the stepped portion and a second portion facing a side surface of the gasket, and
wherein the seal member is in contact with the second portion and the cylinder head.

13. The internal combustion engine according to claim 1, wherein the seal member abuts the ring member and the cylinder head.

14. The internal combustion engine according to claim 1, wherein the seal member further abuts the gasket.

* * * * *